(12) United States Patent
Körner

(10) Patent No.: US 7,234,302 B2
(45) Date of Patent: Jun. 26, 2007

(54) HOUSING FOR A TURBOCHARGER

(75) Inventor: Thomas Körner, Recklinghausen (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/726,760

(22) Filed: Dec. 3, 2003

(65) Prior Publication Data

US 2004/0109759 A1 Jun. 10, 2004

(30) Foreign Application Priority Data

Dec. 3, 2002 (EP) .................................. 02026895

(51) Int. Cl.
| | |
|---|---|
| F02D 23/00 | (2006.01) |
| F01N 7/10 | (2006.01) |
| F01N 7/00 | (2006.01) |
| F01N 7/06 | (2006.01) |
| F01N 3/02 | (2006.01) |
| F01D 1/02 | (2006.01) |
| F04D 29/44 | (2006.01) |
| F04D 29/54 | (2006.01) |
| B32B 1/00 | (2006.01) |
| F16L 21/00 | (2006.01) |

(52) U.S. Cl. ........................... 60/602; 60/323; 60/231; 60/322; 415/204; 428/174; 285/41

(58) Field of Classification Search .................. 60/602, 60/320–321, 322–323; 417/406, 175; 415/175, 415/177–178, 204–205, 206, 119, 213.1; 285/417
See application file for complete search history.

(56) References Cited

U.S. PATENT DOCUMENTS

| | | | | |
|---|---|---|---|---|
| 2,423,462 A | * | 7/1947 | Mercier | 285/417 |
| 2,529,880 A | * | 11/1950 | McClure | 415/177 |
| 3,068,638 A | * | 12/1962 | Birmann | 60/323 |
| 3,310,940 A | * | 3/1967 | Oetliker | 415/177 |
| 3,948,052 A | * | 4/1976 | Merkle et al. | 60/605.1 |
| 4,182,122 A | * | 1/1980 | Stratton et al. | 60/322 |
| 4,194,484 A | * | 3/1980 | Kirchweger et al. | 60/321 |
| 4,288,988 A | * | 9/1981 | Curtil | 60/323 |
| 4,689,952 A | * | 9/1987 | Arthur et al. | 60/323 |
| 5,463,867 A | * | 11/1995 | Ruetz | 60/602 |
| 5,816,043 A | * | 10/1998 | Wolf et al. | 60/323 |
| 6,647,715 B2 | * | 11/2003 | Farkas | 60/323 |
| 2002/0100289 A1 | * | 8/2002 | Davis, II | 415/204 |

(Continued)

FOREIGN PATENT DOCUMENTS

DE 3334413 A1 * 3/1984 .................. 60/622

(Continued)

*Primary Examiner*—Thai-Ba Trieu
(74) *Attorney, Agent, or Firm*—Akerman Senterfitt; Greg Dziegielewski

(57) ABSTRACT

A housing for a turbocharger forms a housing jacket (6, 7) which surrounds a rotor space (15) for receiving a turbine rotor (18). The housing jacket consists of sheet metal at least in part. A connection pipe (4') provides for communication with an exhaust gas manifold (3, 4) of a combustion motor (20). To reduce heat losses, it is not only the housing jacket (6, 7, 22) which surrounds the rotor space (15) and consists of sheet metal, but at least the connection pipe (4') for communication with the exhaust gas manifold (3, 4) is shaped of sheet metal and is in heat conductive connection with the sheet metal of the housing jacket (6, 7, 22).

18 Claims, 4 Drawing Sheets

U.S. PATENT DOCUMENTS

| | | | |
|---|---|---|---|
| 2004/0142152 A1* | 7/2004 | Chen et al. | 428/174 |
| 2005/0126163 A1* | 6/2005 | Bjornsson, Sr. | 60/323 |
| 2005/0183414 A1* | 8/2005 | Bien et al. | 60/323 |

FOREIGN PATENT DOCUMENTS

| | | | | |
|---|---|---|---|---|
| DE | 3815406 A1 | * | 11/1988 | 60/322 |
| DE | 3721608 A1 | * | 1/1989 | 60/322 |
| DE | 10022052 A1 | * | 3/2001 | |
| DE | 10336978 B3 | * | 1/2005 | |
| EP | 0 671 551 A1 | | 3/1995 | |
| GB | 1199158 | * | 7/1970 | |
| GB | 1 263 932 | * | 2/1972 | |
| JP | 54129221 A | * | 10/1979 | |
| JP | 55037508 A | * | 3/1980 | |
| JP | 05240193 A | * | 9/1993 | 415/199 |
| WO | WO 9748943 A1 | * | 12/1997 | |

* cited by examiner

HOUSING FOR A TURBOCHARGER

The present application claims priority of Patent Document No. 02 026 895.9 filed in Europe on Dec. 3, 2002, the disclosure of which is expressly incorporated by reference herein.

FIELD OF THE INVENTION

The present invention relates to a housing for a turbocharger with a rotor space for receiving and accommodating at least one turbine rotor, said rotor space being surrounded by a housing jacket, made, at least partially, of sheet metal. Further there is a tubular supply channel to be connected to at least one exhaust gas manifold of a combustion motor.

BACKGROUND OF THE INVENTION

Turbine housings of sheet metal have been suggested in various documents. Examples are U.S. Pat. No. 2,801,043; DE-A-100 22 052 or WO 01/94754. The advantage of such a construction resides in a simple production possibility and little weight as compared with cast turbine housings. Furthermore, the so-called LSI technique should be mentioned, i.e. housings having an insulated air gap.

Apart form the production problems, a different problem in turbochargers, which forms the basis of the present invention, is the fact that a catalyst, after starting the combustion motor, needs some time to attain its operating temperature in which it develops its full efficiency. If the turbocharger is operating during this time, it takes over part of the heat of the exhaust gas so that the gas reaching the catalyst has already cooled down a bit so that the catalyst needs more time to reach its normal operational temperature. This time is still prolonged when using cast housings for the turbocharger, because they have a higher heat absorption capacity.

SUMMARY OF THE INVENTION

In a first step, the invention is based on the recognition that the use of sheet metal for a turbocharger housing constitutes a certain improvement for the last-mentioned problem, but that with the known constructions no optimum is achieved with respect to the thermal problems. In so far, it is an object of the present invention to reduce the heat losses on the way up to the catalyst.

This object is achieved according to the invention in that not only the housing of the rotor space is made of sheet metal, but also the connection pipe is of sheet metal, and that the housing and the connection pipe have a heat conductive interconnection. In this way, a substantially undisturbed flow of heat from the source of heat, i.e. the combustion motor, up to the turbocharger is ensured so that a subsequent catalyst, in spite of simultaneous operation of the turbocharger, reaches relative quickly its normal operational condition. In short: the heat absorption capacity is smaller than with a cast housing plus connection pipe.

By the invention, it is not only this object which is achieved, but there are, in a surprising manner, still further advantages:

while in the prior art mentioned above, the connection between the housing and the manifold was effected by a flange connection, this is no longer necessary which leads to a certain reduction in weight;

without a flange, however, mounting is facilitated, because that space which was necessary for mounting flange bolts, is no longer needed which means also that the housing arrangement can be more compact, if desired;

a flange sealing is no longer necessary;

while a great number of welding seams were necessary adjacent to the flange connection, this number is greatly reduced with the design according to the present invention.

A further simplification will be achieved if at least part of the heat conductive interconnection is formed as a sliding connection that allows a relative movement of the parts without loosing the heat transferring contact. Preferably, this sliding connection comprises a conical enlargement of a predetermined angle on one of the tubular parts, particularly the housing jacket, into which the other tubular part can be inserted. In this way, cumbersome mounting procedures are omitted. The term "sliding connection", in the context of the present specification, should means a connection where the parts are merely inserted into one another, but still have the possibility of a sliding relative movement due to heat expansion, vibration and so on.

If the housing jacket is made of at least two layers of sheet metal, it is advantageous to make the outer layer thicker than the inner layer. For, on the one hand, by providing at least two layers, a higher strength and an improved insulation (less heat losses) will be achieved, while on the other hand, a thicker layer of sheet metal, and this is preferably the outer one, provides an improved bursting strength.

Manufacture of the housing according to the invention is suitably effected so that the housing jacket is composed of at least two complementary spiral portions (which can easily be produced by stamping or pressing) which are interconnected by welding. Preferably, the tubular supply channel is also composed of two complementary parts each extending in axial direction, and is, in particular, integrally formed with the spiral complementary parts. In this way, a sealed and reliable interconnection is achieved which is also less space consuming than the flanges used up to now. Thus, with a single welding seam, the interconnection can be produced over the entire length (when seen transversely to the axis of rotation of the turbine).

BRIEF DESCRIPTION OF THE DRAWINGS

Further details of the invention will become apparent from the following description of embodiments schematically illustrated in the drawings in which

FIG. 3 a first embodiment of an interconnection of turbine housing and connection pipe to the exhaust gas manifold in a cross-sectional view transversely to the axis of the turbine, to which

DETAILED DESCRIPTION OF THE DRAWINGS

Figure 1:
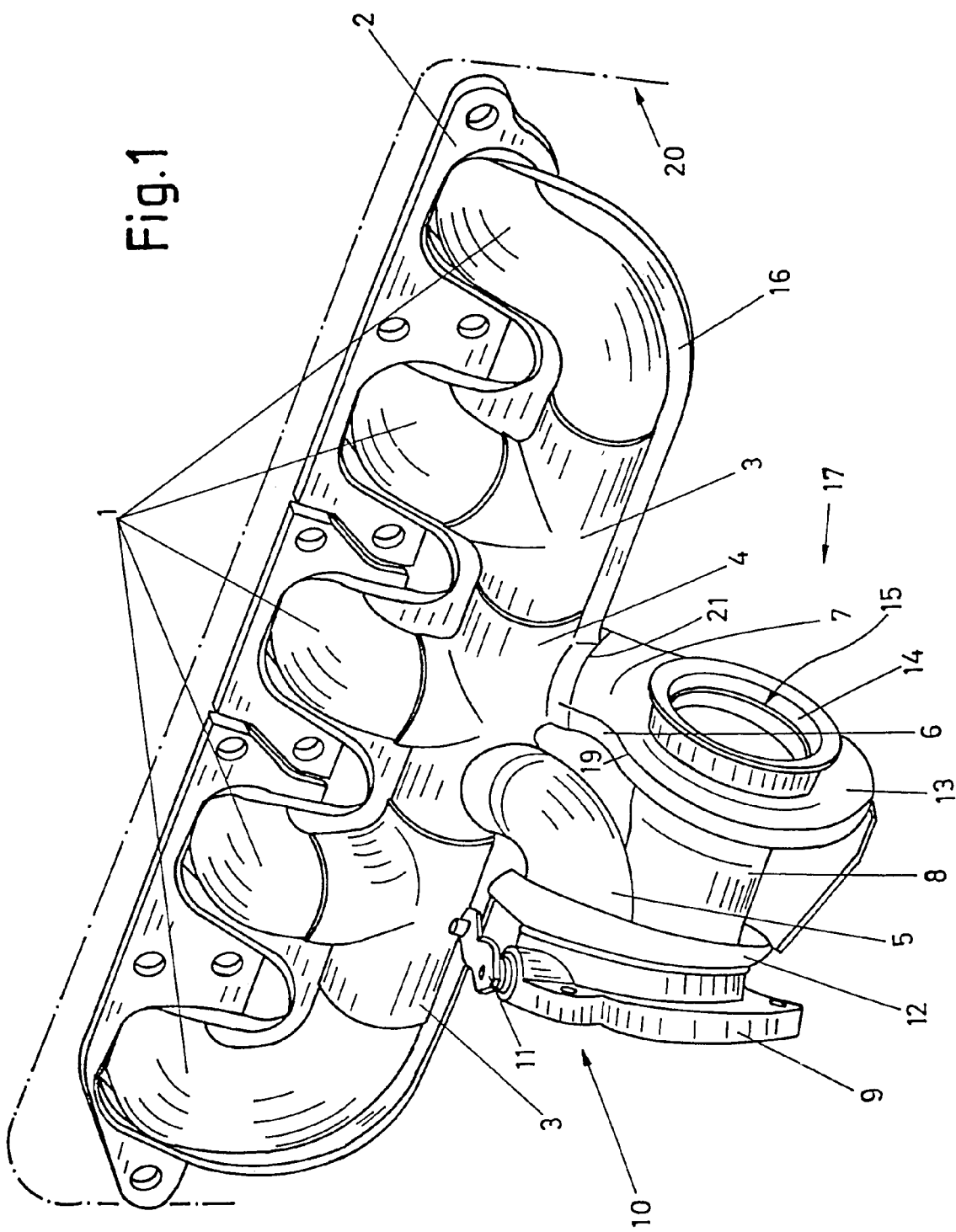
FIG. 1 is a perspective view of a unit including an exhaust gas manifold of a combustion motor and a turbine housing of a turbocharger.

From a combustion motor 20, merely indicated in dash-dotted lines in FIG. 1, four of the five elbow pipes 1 lead each to respective T-shaped exhaust gas pipe pieces 3 and, finally, discharge all into a manifold piece 4. The four exhaust gas pipe pieces 3 and the manifold piece 4 together form an exhaust manifold. It is clear that this is only given by way of example, and that the invention is not restricted to a certain number of elbow pipes 1. The T-shaped exhaust gas pipe pieces 3 are welded to an inlet flange 2 which is attached to the combustion motor 20. However, the invention is not restricted to such a construction, because an exhaust gas manifold of any kind known in the art may be used where the manifold piece 4 is then inserted. In the present case, it is advantageous to cover the individual pieces 3, 4 by a lower cover 16 from below, and an upper cover may also be provided and be opposed to the lower cover 16. Between the individual pieces 3, 4 of the exhaust manifold and the covers, such as at 16, an insulation layer, e.g. of a nonwoven fabric, may be provided.

The manifold piece 4 forms the interconnection between the manifold piece 3 and a turbine housing 17. In this, manifold piece 4 terminates the middle elbow pipe 1 (it could be any other elbow pipe instead, for example an elbow pipe at the end of the manifold), and is connected in the axial direction to each one of the T-shaped exhaust gas pipe pieces 3. Advantageously, at least part of these components of the manifold, preferably at least the manifold piece 4, but optionally also at least part of the T-shaped exhaust gas pipes, is formed of a shaped sheet metal. For shaping, explosive forming is conceivable, but preferably stamping or isostatic pressing or hydraulic pressing (e.g. by applying hydraulic pressure to the inner surfaces onto a sheet metal in a corresponding die). An alternative could be to manufacture the manifold piece 4 as a precision cast part.

A further connection pipe from the manifold piece 4 could lead to a by-pass channel 5 through which at least part of the exhaust gas of the combustion motor 20 may be directed to another place of use, such as a catalyst, under the control of a flap 10 (the arrow shows only the place where this flap is) which is actuated by a lever 11. It can be seen that the lever 11 is fastened to a shaft supported in a flange 9 that is connected, e.g. welded, to a discharge channel 8. A special sleeve, as in the prior art, for accommodating the flap 10 and actuation shaft together with the lever 11, can be omitted.

The turbine housing 17 is generally spirally shaped in a conventional manner to guide the exhaust gas to a turbine or turbine rotor (see 18 in FIGS. 3 and 4) which is situated in the middle of the spiral. This turbine housing 17 surrounds a rotor space 15 wherein the turbine rotor 18 (see FIGS. 3, 4) rotates. As best seen in FIG. 1, the turbine housing 17 is composed of a left spiral housing half part 6 and a right housing half part 7, the halves being welded together along a line or seam 19 (FIG. 1), In this way, a sealed and less space consuming unit is provided than is possible with a flange connection (which is also heavier in weight) along the line 19. To the right housing half piece 7 the bearing housing or the compressor housing of a turbocharger can be connected, the compressor being driven by the turbine 18. For connecting these parts of a turbocharger, a bearing housing flange 14 is provided which is welded to the right housing half part 7 or is sealingly connected to it in any other way known in the art. The left housing half part 6, in turn, forms not only the half spiral, but also the known wheel contour of the turbine 18 (FIGS. 3, 4) and the connection to a discharge channel 8 as is customarily provided. This discharge channel 8 may preferably be made of a sheet metal and may be connected to the turbine housing 17 in a similar manner as will be described later with reference to the connection between the exhaust gas inlet 21 and the turbine housing 17 in the context of FIGS. 3 and 4.

For, as may be seen, the welding seam 19 does not only extend over the spiral housing part of the turbine housing 17, but is prolonged such that it is integral also with the exhaust gas inlet 21 that is immediately connected to the manifold piece 4. In this way, heat losses are reduced, and manufacture is facilitated. A further layer of sheet metal may be provided over the turbine housing, thus produced, such as a cover 13, and, if desired, also a bursting (for preventing bursting parts to escape the housing). Within the scope of the present invention, it is quite possible to provide four layers of sheet metal. On the other hand, combinations are also possible where some components, such as the cover 13 or the bearing housing flange 14 mentioned above are precision cast.

Figure 2:
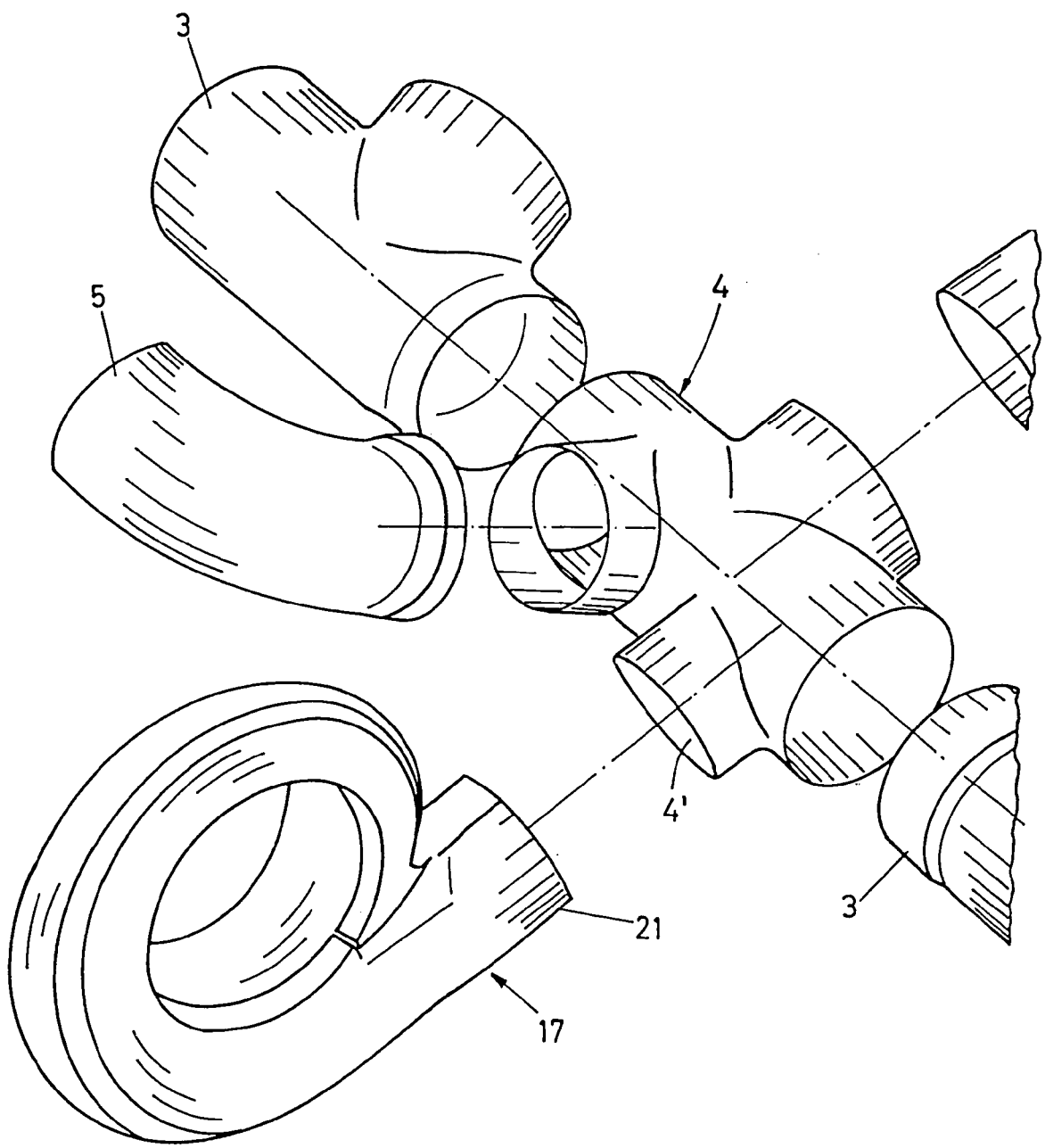
FIG. 2 the individual parts of this unit in an exploded view.

FIG. 2 illustrates the construction, as explained above, and its components more clearly in an exploded view. Now, two embodiments having each an outer and an inner layer of sheet metal and at least one insulating layer in-between shall be described shown and described how these parts are assembled.

Figure 3:
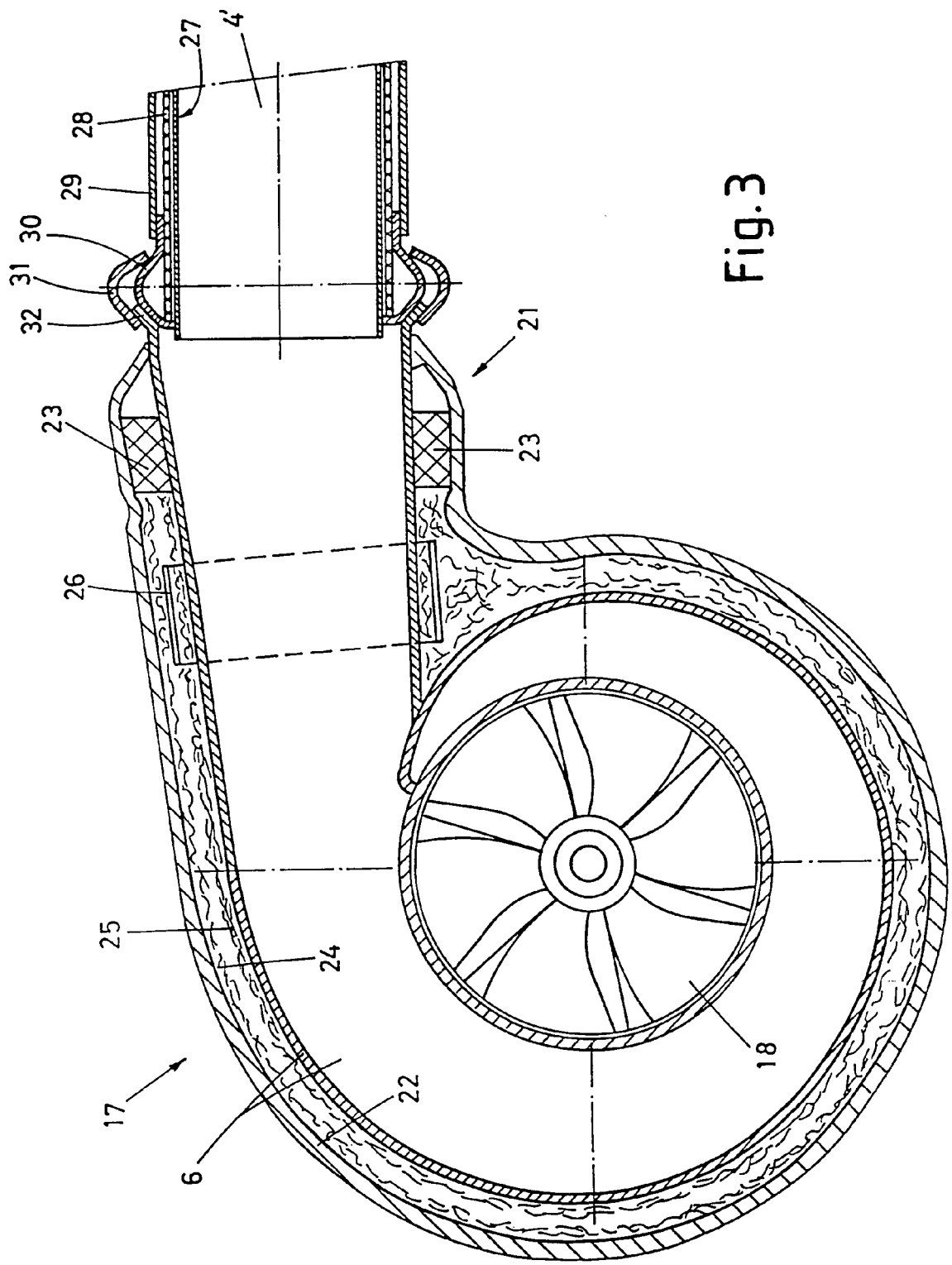

According to FIG. 3, the turbine housing jacket 17 is formed of an inner layer or inner spiral portion or housing part 6 of sheet metal of, for example, 0.5 to 1.5 mm in thickness, which is surrounded by an outer thicker sheet metal portion or layer 22. The sheet metal portion 22 has, for example, a thickness in the range of 1.5 to 5 mm. Thus, the outer sheet metal layer 22 may optionally be 1.5 to 3 times as thick as the inner layer 6. Between these layers of sheet metal is preferably a distance of at least 1 mm and, preferably, 8 mm in maximum. For example, the distance is in a range of 2 mm to 5 mm. As in the case of the two spiral halves 6, 7, the outer sheet metal layer 22 may also be composed of two (spiral) halves. Of course, the layers could also be composed of more than two parts.

Both parts may be kept spaced by spacers 23, suitably being insulating, wherein the spacer 23 shown in FIG. 3 may be annular and may surround the exhaust gas inlet 21 of the turbine housing 17. In the end region of the sheet metal 22 shown in FIG. 3 at right, this sheet metal 22 is pressed against the inner sheet metal layer (part 6) and, for example, welded thereto.

Between the two layers of sheet metal 6, 22 at least one insulating layer con be provided, thus forming an outer layer with respect to the inner layer 6. In the embodiment shown, the insulating layer comprises two textile fabric layers 24 and 25, between which, optionally, a thin metal or sheet metal layer 26 can be arranged which, for example is reflecting towards the radial interior. The intermediate sheet metal layer 26, according to the embodiment shown in FIG. 3, is only provided within the region of the supply channel 21, but can be provided in the whole interspace between the inner sheet metal layer 6 and the outer sheet metal layer 22. The fact of having such an intermediate sheet metal layer 26 in the region of the spiral housing portion around the turbine rotor space 15 (FIG. 1) has the particular advantage of providing a still better burst protection.

To the exhaust gas inlet 21, integrally produced with the housing 17, a branch pipe 4' of the manifold piece 4 (see FIG. 2) is connected by a mere sliding connection without welding, this branch pipe forming a connection conduit. It may be seen that at least this branch pipe 4', but optionally the whole manifold piece 4, is constructed of an inner pipe layer 27, an insulating layer 28 and an outer sheet metal layer 29. As may be seen, this outer sheet metal layer 29 may consist of a thicker sheet metal, although bursting protection is not required in this area. Nevertheless, a thicker outer layer may improve insulation, while inside a better heat conduction is intended. However, it should be noted here that, although an integral construction of the branch pipe 4' with the manifold piece 4 is preferred, it is not required in all cases.

Between the inner sheet metal layer 27 and the outer sheet metal layer 29, there is an annular bulge profile 30 which is clamped or welded to the outer sheet metal layer 29. The left end (as seen in FIG. 3) of this bulge profile 30 may be welded to the inner sheet metal 27. It is, however, also possible to provide only one welding seam, because it would suffice to prevent relative shifting of the parts. This bulge profile 30 cooperates with a conical enlargement or conical portion 32 at the end of the supply channel 21, because it provides, together with the enlargement, a support for a clamping ring 31, which is either snapped on or is contracted by a screw (not shown). This clamping ring 31 secures the connection conduit 4' on the supply channel 21. Thus, heat conduction from the connection conduit 4' of the manifold piece 4 to the turbine housing jacket 17 is effected through sheet metals 27, 29, the bulge profile 30 and the conical portion 32.

Figure 4:
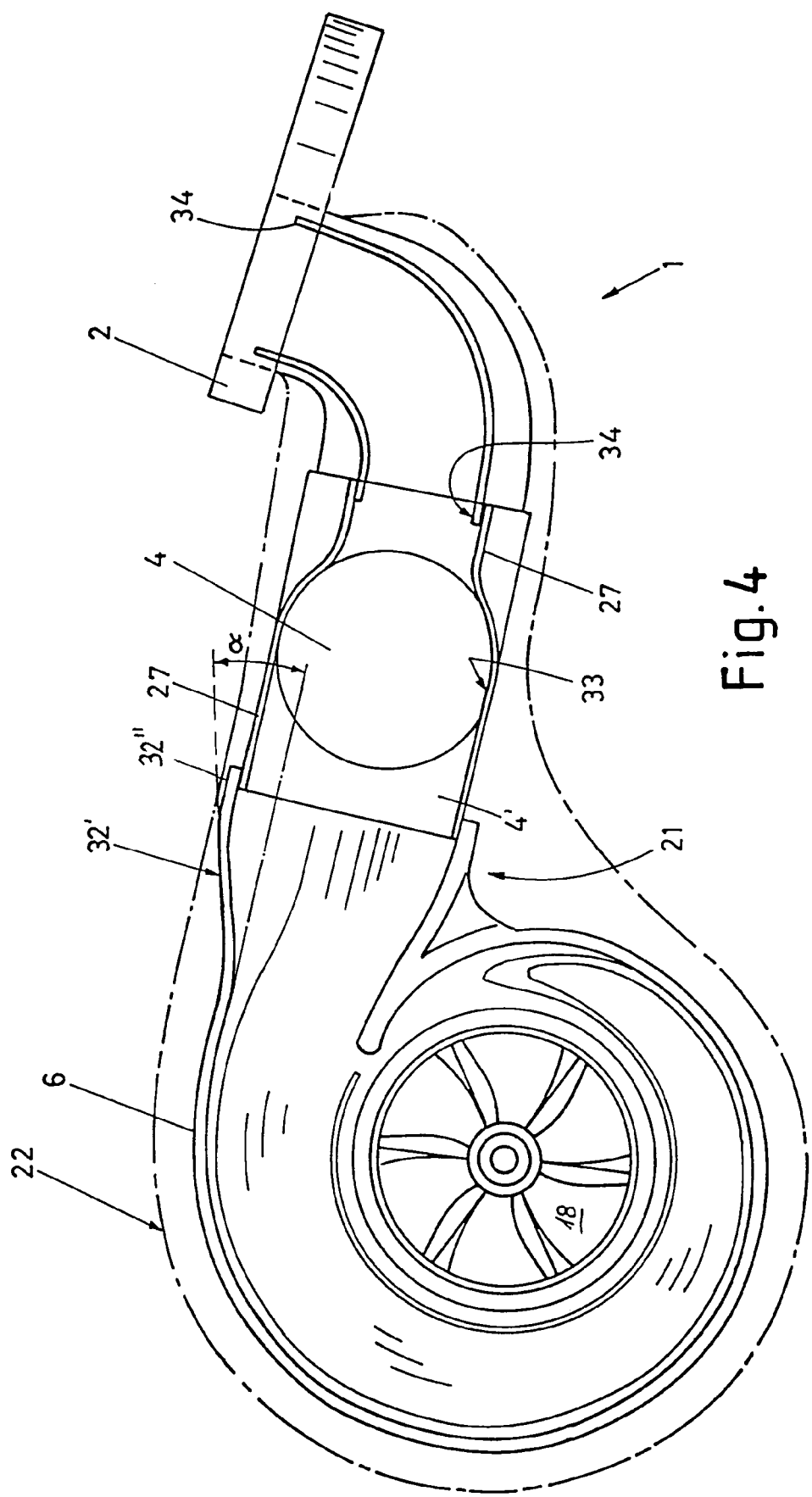
FIG. 4 shows a preferred alternative embodiment.

A still improved heat conduction is obtained with an embodiment according to FIG. 4. This embodiment differs from the embodiment of FIG. 3 in that the conical portion 32' has a smaller angle α that in the previous embodiment. This angle α should amount to 30° in maximum, and preferably 20° in maximum, so that the inner sheet metal layer 27 engages it frictionally and heat conduction is effected over a relative large area. This angle α should, however, not be too small not to make inserting of the inner tubular sheet metal too difficult. Therefore, it should amount at least to 7°. The most favorable construction is advantageously so that the conical portion 32' serves as an input funnel for the spiral housing 17, and is enlarged just to such an extent that the branch pipe 4' can be inserted into a cylindrical end portion 32" thereby engaging the inner surface of the cylindrical portion 32". In this way1 the connection is well sealed. The length of the cylindrical portion 32" is suitably chosen so that the branch pipe 4' may shift in it in the case of heat expansion or due to vibration of the combustion motor 20. It will be understood that it would, theoretically, be possible to form the end of the exhaust gas inlet 21 without a conical portion or transition in such a way that the cylindrical portion 32" mentioned above is in contact with the branch pipe connection conduit 4'.

FIG. 4 shows not only the connection conduit 4' of the manifold piece 4, but the whole manifold in cross-section. This manifold has an opening 33 in the middle from which the connection to the adjacent parts is effected to both sides (see also FIG. 1). After this opening 33 (in FIG. 4 at right), the inner tube or pipe 27 is narrowed and receives an inner elbow pipe 34 inserted into it which is accommodated in an outer tube 35 and is welded to the flange 2 (see also FIG. 1). Thus, the two layers 34, 35 form the elbow pipe 1 of FIG. 1.

As is indicated in dash-dotted lines as an outer contour, also in the embodiment shown may be provided an outer sheet metal layer 22, similar to the embodiment of FIG. 3. However, while the outer sheet metal layer 22 is interrupted in the embodiment of FIG. 3, in the preferred embodiment of FIG. 4 only the inner sheet metal layers 6, 27, 34 are in a mere sliding connection, as has been explained above, which is easily to be produced, whereas the outer sheet metal layer 22 is welded over the whole length shown in FIG. 4 which can easily be done from outside. Thereby, it is true that the connection of the inner layers 6, 27, 34 will not be completely gasproof, and gas may enter the interspace between the inner layer and the outer layer 22, but this will rather contribute to heat insulation. However, it will be understood that also in this embodiment the further layers 24–26, described above with reference to FIG. 3, could also be used in the embodiment of FIG. 4. Furthermore, it may be advantageous to surround also the outer sheet metal layer 22 with an insulation layer. Useful inner (24, 25) and/or outer insulations in this connection are described in WO 97/48943 which discloses a fitting woven fabric, while WO 00/05532 discloses a fitting knitted fabric. It should be noted, however, that the construction with the sliding connection, as defined above, i.e. a plug-in connection which allows a relative movement of the parts without loosing their heat transferring contact, has also a particular advantage, if the manifold 4 or the manifold piece 4' are not of sheet metal so that this interconnection of the related parts constitutes an invention for its own, even if the housing is not of sheet metal.

As may be seen, the outer layer 22 is about uniformly spaced from the inner sheet metal layer 6 or 33 over the major part of the housing jacket 17 together with the interconnected connection pipe 4'. This distance between the outer and the inner parts should amount to about 1 mm in minimum and preferably 8 mm in maximum, but will be normally within the range of 2 mm to 5 mm. For technical reasons of shaping, smaller distances (e.g. at 32") or even a larger distance (see at 21) may also be advantageous in some cases.

If the two-layer construction, as in the above embodiment of FIG. 4, is continuous, the smallest heat losses will occur as compared with the prior art where a flange connection was provided. For just the region of interconnection between the spiral housing jacket 17 and the manifold 4 or the connection pipe 4' is, in practice, the hottest region. If a flange is provided there, it has (apart from its high weight) a relative large area over which much heat is dissipated, it constitutes a thermal bridge to ambient. With the approach according to the present invention, however, such a flange is not longer necessary so that superfluous heat losses are avoided.

Various modifications are conceivable within the scope of the present invention, for example that not the larger dimensioned exhaust gas inlet 21 surrounds the smaller branch pipe 4', but just vice-versa. However, such a construction would be less preferred, because it is less favorable from a fluidic point of view than in the embodiment illustrated. Furthermore, it is, of course, possible to use only one sheet metal layer which has preferably either a sliding connection or a welded connection between the individual parts. In addition, the spacers 23 shown in FIG. 3 may be formed in a variety of shapes and can be arranged wherever desired between the layers, if only their function is ensured.

| Reference List | |
|---|---|
| 1 | Elbow Pipe |
| 2 | Inlet Flange |
| 3 | T-Shaped Piece |
| 4 | Manifold Piece |
| 5 | By-pass Channel |
| 6 | Housing part |
| 7 | Housing Part |
| 8 | Discharger Channel |
| 9 | Flange |
| 10 | Flap |
| 11 | Lever |
| 12 | Outlet sheet metal |
| 13 | Cover |
| 14 | Bearing housing flange |
| 15 | Rotor Space |

-continued

| Reference List | |
|---|---|
| 16 | Cover |
| 17 | Turbine Housing |
| 18 | Turbine rotor |
| 19 | Seam |
| 20 | Combustion Motor |
| 21 | Supply Channel |
| 22 | Sheet Metal Portion |
| 23 | Spacer |
| 24 | Insulating Layer |
| 25 | Insulating Layer |
| 26 | Metal Layer |
| 27 | Metal Layer |
| 28 | Insulating Layer |
| 29 | Sheet Metal Layer |
| 30 | Bulge Profile |
| 31 | Clamping Ring |
| 32 | Conical Enlargement |
| 33 | Opening |
| 34 | Inner Elbow Pipe |
| 35 | Outer Tube |

What is claimed is:

1. A turbocharger and exhaust manifold system comprising
a turbine housing (6, 7, 22) defining a rotor space (15) for receiving and accommodating a turbine rotor (18);
an exhaust gas manifold of a combustion motor (20), said exhaust gas manifold including a branch pipe (4') that connects said turbine housing (6, 7, 22) to at least one piece (3, 4) of said exhaust gas manifold, wherein a portion of the branch pipe (4') extends into at least a portion of the turbine housing (6);
wherein the turbine housing (6, 7, 22) and at least the branch pipe (4') for the connection with the exhaust gas manifold piece (3, 4) are made of sheet metal, and
wherein the exhaust gas manifold pieces (3, 4) are in thermal connection with said turbine housing (6, 7, 22), wherein the thermal connection is at least partially realized by a sliding connection.

2. The turbocharger and exhaust manifold system according to claim 1, wherein said heat conductive connection is formed between first and second tubular elements by a conically widening portion (32; 32') of one of the tubular elements, followed by a cylindrical portion (32") into which the tubular end of the respective other element is inserted, the conically widened portion having an angle (α) of at most 30° and whereby the inner surface of the cylindrical portion (32") abuts onto the outer surface of the tubular end of said respective other element, wherein one of said tubular elements is the housing (6, 7, 22) and the other of said tubular elements is the branch pipe (4').

3. The turbocharger and exhaust manifold system according to claim 2, wherein said angle (α) is at most 20°.

4. The turbocharger and exhaust manifold system according to claim 2, wherein said angle (α) is at least 7°.

5. The turbocharger and exhaust manifold system according to claim 1, wherein said hear conductive connection is formed between first and second tubular elements, wherein said heat conducting connection comprises a cylindrical portion (32") of one of the tubular elements into which the tubular end of the respective other tubular element is insertable, wherein the inner surface of the cylindrical portion (32") abuts onto the outer surface of the branch pipe (4').

6. The turbocharger and exhaust manifold system according to claim 1, wherein said housing (6, 7) consists of at least two layers of sheet metal arranged one outside of the other, wherein the outer one (22) is thicker than the inner one (6).

7. The turbocharger and exhaust manifold system according to claim 6, wherein the distance between said two layers of metal sheet (6, 22) over the bigger part of the extension of the housing is at least 1 mm.

8. The turbocharger and exhaust manifold system according to claim 6, wherein the inner of the sheet metals layers (6, 22) is attached to the branch pipe (4') by a sliding connection, whereas the respective outermost sheet metal layer (22) is formed of a first spiral housing half pan (6) and a second half part (7).

9. The turbocharger and exhaust manifold system according to claim 6, wherein outer sheet metal (22) is 1.5 to 3 times thicker than the inner sheet metal (6).

10. The turbocharger and exhaust manifold system according to claim 6, wherein the distance between said two layers of metal sheet (6, 22) at least over the bigger part of the extension of the housing, a distance of is between 2 and 5 mm.

11. The turbocharger and exhaust manifold system according to claim 10, wherein the insulation layer (24, 25) is a woven or knitted fabric and wherein said metal layer (26) is a sheet metal layer.

12. The turbocharger according to claim 1, wherein outside the inner layer of sheet metal (6) of the housing (6, 7, 22) there is at least one insulation layer (24, 25).

13. The turbocharger and exhaust manifold system according to claim 12, wherein the insulation layer (24, 25) is made of a textile tissue within which is embedded a metal layer (26).

14. The turbocharger and exhaust manifold system according to claim 1, wherein said housing (6, 7) is assembled from at least two mutually complementary spiral portions, which are connected to each other by welding, whereas an exhaust gas inlet (21) of the housing wall and said branch pipe (4') are in two parts, each of which as respectively in one piece with the corresponding spiral portion.

15. The turbocharger and exhaust manifold system as in claim 1, wherein said manifold piece (4) is stamped sheet metal.

16. The turbocharger and exhaust manifold system as in claim 15, wherein the exhaust gas elbow pipe (1) is stamped sheet metal.

17. A turbocharger and exhaust manifold system comprising:
a turbine housing (6, 7, 22) defining a rotor space (15) for receiving and accommodating a turbine rotor (18);
a branch pipe (4') connecting said turbine housing (6, 7, 22) to a least one piece (3, 4) of an exhaust gas manifold of a combustion motor (20);
wherein the turbine housing (6, 7, 22) and at least the branch pipe (4') for the connection with the exhaust gas manifold piece (3, 4) are made of sheet metal,
wherein the exhaust gas manifold pieces (3, 4) are in thermal connection with said turbine housing (6, 7, 22) at least partially realized by a sliding connection, and
wherein said heat conductive connection is formed between first and second tubular elements by a conically widening portion (32; 32') of one of the tubular elements, followed by a cylindrical portion (32") into which the tubular end of the respective other element is inserted, the conically widened portion having an angle (α) of at most 30° and whereby the inner surface of the cylindrical portion (32") abuts onto the outer surface of the tubular end of said respective other element.

18. A turbocharger and exhaust manifold system comprising.
- a turbine housing (6, 7, 22) defining a rotor space (15) for receiving and accommodating a turbine rotor (18);
- a branch pipe (4') connecting said turbine housing (6, 7, 22) to at least one piece (3, 4) of an exhaust gas manifold of a combustion motor (20);
- wherein the turbine housing (6, 7, 22) and at least the branch pipe (4') for the connection with the exhaust gas manifold piece (3, 4) are made of sheet metal,
- wherein the exhaust gas manifold pieces (3, 4) are in thermal connection with said turbine housing (6, 7, 22) at least partially realized by a heat conductive sliding connection formed between first and second tubular elements,
- wherein one of said tubular elements is the housing (6, 7, 22) and the other of said tubular elements is the branch pipe (4'), and
- wherein said heat conducting connection comprises a cylindrical portion (32") of one of the tubular elements into which the tubular end of the respective other tubular element is insertable, wherein the inner surface of the cylindrical portion (32") abuts onto the outer surface of the branch pipe (4').